US008324566B2

(12) United States Patent
Kaplan et al.

(10) Patent No.: US 8,324,566 B2
(45) Date of Patent: Dec. 4, 2012

(54) ISOLATION OF IONS IN OVERLOADED RF ION TRAPS

(75) Inventors: Desmond Allen Kaplan, Billerica, MA (US); Andreas Brekenfeld, Bremen (DE); Christoph Gebhardt, Bremen (DE); Ralf Hartmer, Hamburg (DE)

(73) Assignee: Bruker Daltonik GmbH, Bremen (DE)

( * ) Notice: Subject to any disclaimer, the term of this patent is extended or adjusted under 35 U.S.C. 154(b) by 27 days.

(21) Appl. No.: 13/037,792

(22) Filed: Mar. 1, 2011

(65) Prior Publication Data

US 2012/0223222 A1 Sep. 6, 2012

(51) Int. Cl.
*B01D 59/44* (2006.01)
*H01J 49/00* (2006.01)

(52) U.S. Cl. ........ 250/283; 250/281; 250/282; 250/287; 250/288; 250/289; 250/290; 250/291; 250/292

(58) Field of Classification Search .......... 250/281–283, 250/287–292
See application file for complete search history.

(56) References Cited

U.S. PATENT DOCUMENTS 4,761,545 A * 8/1988 Marshall et al. .............. 250/291
4,818,869 A 4/1989 Weber-Grabau
7,378,648 B2 * 5/2008 Wang et al. .................... 250/282
7,456,396 B2 * 11/2008 Quarmby et al. ............. 250/292
2008/0048112 A1 2/2008 Makarov

FOREIGN PATENT DOCUMENTS

GB 2485063 A 5/2012

OTHER PUBLICATIONS

Lammert, et al., "Pulsed Axial Activation in the Ion Trap: A New Method for Performing Tandem Mass Spectroscopy (MS/MS)", Rapid Communications in Mass Spectrometry, vol. 6, pp. 528-530, 1992, John Wiley & Sons, Ltd.
Prentice, et al., "DC Potentials Applied to Endcap Electrodes of 3-D Ion Traps for Increased Ion Injection Efficiency and Manipulation of Ion/Ion Reactions", 58$^{th}$ ASMS Conference May 23-27, 2010, Salt Lake City, UT.
Aug. 6, 2012 British Search Report.

* cited by examiner

*Primary Examiner* — Jack Berman
*Assistant Examiner* — Meenakshi Sahu
(74) *Attorney, Agent, or Firm* — Law Offices of Paul E. Kudirka

(57) ABSTRACT

In an RF quadrupole ion trap having electrodes to which RF voltages are applied, ions having m/z ratios outside of a predefined narrow range of charge-related masses m/z are removed from the trap by applying a DC voltage pulse to at least one of the trap electrodes to remove from the trap the ions with high values of charge-related masses. The DC voltage pulse is preferably applied in combination with a variation of the RF voltage amplitudes to simultaneously remove from the trap ions of low charge-related masses. The DC and RF voltage amplitudes are changed in such a manner that any excitation of ions having charge-related masses within the predefined range by frequency mixtures is avoided.

7 Claims, 3 Drawing Sheets

ISOLATION OF IONS IN OVERLOADED RF ION TRAPS

BACKGROUND

The invention relates to the isolation of ions of a predefined narrow range of charge-related masses m/z in an RF quadrupole ion trap by removal of all other ions. The process of keeping "desired" ions, usually ions of a predefined narrow range of charge-related masses m/z, inside an ion trap while removing all "undesired" ions is called "isolation". The usually narrow mass range of desired ions is denominated an "isolation window". Quite often ions of a single mass or all ions of an isotope group are isolated. The purpose of isolation usually is the provision of analyte ions of one single type for further chemical or physical reactions and subsequent analysis of the reaction products, e.g. fragmentation and analysis of the fragment ions, without the presence of other types of ions which may disturb the analytical results. Fragment ions or reaction product ions can be used to study molecular structures (e.g. amino acid sequences) or chemical behavior of analyte ions.

Usually the undesired ions are "eliminated" (or "removed") by resonant excitation which increases their oscillation amplitudes until they collide with the electrodes of the ion trap, thereby discharging and destroying the ions. Elegant elimination methods use complex mixtures of excitation frequencies to eliminate most of (or even all) the undesired ions simultaneously. Such mixtures of excitation frequencies are often called "broadband waveforms" or "waveform signals". The first application of such waveforms goes back to A. Marshall et al. (U.S. Pat. No. 4,761,545; 1988). Marshall et al. excited ions inside ion cyclotron resonance cells by mixtures of excitation frequencies (SWIFT=Stored Waveform [calculated by] Inverse Fourier Transformation). The term "stored waveform" refers to a digital storage memory, from which digital values are transferred, in fast sequence, to a digital-to-analog converter (DAC), connected to excitation electrodes. The DAC then delivers the frequency mixture as an output. Modern applications of such frequency mixtures for ion isolation in RF ion traps are described in documents U.S. Pat. No. 7,456,396 B2 (S. T. Quarmby et al., 2004: "Isolating Ions in Quadrupole Ion Traps for Mass Spectrometry") and U.S. Pat. No. 7,378,648 B2 (M. Wang et al., 2005: "High Resolution Ion Isolation Utilizing Broadband Waveform Signals"). These methods of synchronous elimination of most or all undesired ions usually work well.

RF quadrupole ion traps can be used as mass spectrometers, in two-dimensional as well as in three-dimensional form. The two-dimensional quadrupole ion trap of FIG. 1 (often called a "linear ion trap") shows four rod electrodes (1 to 4) with hyperbolic surfaces; at the ends, two apertured diaphragms usually close the inner volume (not shown in FIG. 1). The three-dimensional ion trap of FIG. 2 consists of two endcap electrodes (11, 13) and one ring electrode (12); both types of electrodes with rotationally hyperbolic surfaces. The ion traps are operated with RF voltages up to 30 kilovolts peak to peak and frequencies of around one megahertz, forming inside quadrupolar pseudopotential wells in two or three dimensions, in which the ions can oscillate as in a real potential well. All types of RF ion traps are operated with a damping gas of a pressure of around one pascal to damp ("cool") the oscillations of the ions within the pseudopotential well of the trap so that they gather in the center. The damping process decreases the oscillation amplitudes exponentially with a time constant of about one millisecond. Ions can be ejected from the center mass-sequentially (in sequence of increasing charge-related masses m/z) through apertures (15) or slits (5) in one (or two) of their electrodes, usually by resonant excitation, and the ions leaving the trap can be measured as a mass spectrum at an ion detector. Scan speeds of 30,000 atomic mass units per second and even more can be achieved, in mass ranges up to 3,000 atomic mass units, with mass resolutions better than a quarter atomic mass unit.

Depending on the time needed to fill the ion trap with ions and on the width of the mass scan, four to eight mass spectra can be acquired per second when no further ion manipulations are required, which is favorable for any combination of the ion trap mass spectrometer with separation processes like gas or liquid chromatography (GC or LC). The spectrum acquisition works successfully when the trap is not overloaded with ions. Favorable numbers of ions amount to 1,000 to 10,000 ions; the space charge of larger amounts of ions destroys a high-quality ejection process, strongly diminishing the mass resolution. If much less ions are loaded, the quality of the spectrum suffers from a low signal-to-noise ratio. To keep the acquisition rate for mass spectra as high as possible, any further processes of ion manipulation like isolation or fragmentation should be designed to be as short as possible.

Within this document, the terms "mass", "heavy ions", "high mass", "light ions", or "low mass" always refer to charge-related masses m/z, m being the mass, and z being the number of unbalanced elementary charges of the ion. Number z has the physical dimension of a pure number; therefore m/z has the physical dimension of a mass.

Analytical ions of interest (the "desired ions"), as generated in usual types of ion sources, are sometimes present only in low concentrations in complex mixtures of ions (see, for instance, the schematic presentation in FIG. 4). If the desired ions are present only in amounts of 0.1 percent, the ion trap has to be overloaded with a million ions in order to keep, after successful isolation, a thousand desired ions in the trap. To keep 10,000 ions, and to care for some losses during isolation, even more than ten million ions have to be filled into the ion trap prior to isolation. $10^7$ ions are about the maximum number of ions which can be filled into an ion trap against the effect of space charge.

Ions with charge-related masses m/z below a so-called cut-off mass $(m/z)_{cut\text{-}off}$ cannot be stored at all in RF ion traps; these ions are already removed during the filling process. The cut-off mass $(m/z)_{cut\text{-}off}$ is directly proportional to the RF voltage. As is well-known by specialists in the field, light ions above the cut-off mass gather in the center, and heavier ions surround the center in layers like onion shells.

In heavily overloaded RF ion traps ($10^5$ to $10^7$ ions), resonant excitation no longer works correctly because space charge couples the movement of ions inside the trap. A strong excitation has to be applied to eliminate ions and energy from excited ions dissipates immediately to ions not directly excited and the desired ions are usually removed together with undesired ions.

But even in RF ion traps which are not heavily overloaded ($10^4$ to $10^5$ ions), resonant excitation does not always successfully remove ions. Particularly extremely heavy ions (high m/z) are hard to excite sufficiently for removal because their low oscillation frequency in the pseudopotential well requires a high excitation voltage and a long excitation time, and the slow oscillations of the heavy ions with their high collision cross sections are continuously damped in the damping gas inside the ion trap. These heavy ions often remain within the ion trap and disturb the following processes, i.e., the reactions of the desired ions and the analysis of the reaction products.

Ions can also be isolated by application of superimposed quadrupolar RF and quadrupolar DC fields, similar to the superposition of RF and DC voltages in quadrupole mass filters. But here the process of isolation is rather slow because the ions in the exact center of the trap do not see any fields; these ions can only be eliminated after they have drifted, by incidental thermal movements, to sufficiently wide locations outside the center. In addition, the electronics needed for this method are rather complex and expensive. Consequently, applications of this method are not known.

The use of sharp DC voltage pulses at single endcap electrodes of three-dimensional ion traps has become known for purposes of ion activation and fragmentation (S. A. Lammert and R. G. Cooks: "Pulsed Axial Activation in the Ion Trap: a New Method for Performing Tandem Mass Spectroscopy (MS/MS)", Rapid Comm. Mass Spectrom., Vol. 6, 528-530 (1992)). The short pulses of typically two microsecond length consist of a superimposed mixture of frequencies, and these frequencies can excite ions to oscillations and even fragment ions by subsequent collisions with damping gas.

DC voltages at endcaps can also be used for other purposes as disclosed in B. M. Prentice et al., 58th ASMS Conference 2010, Salt Lake City: "DC Potentials Applied to Endcap Electrodes of 3-D Ion Traps for Increased Ion Injection Efficiency and Manipulation of Ion/Ion Reactions". In this presentation, the use and effect of DC voltages on endcap electrodes has been investigated. This work states that there exist "Sporadic reports of dipolar DC in ion trap literature, but little systematic work has been reported in the open literature". Among other applications, single electrode DC voltages were used by the authors to help isolation by resonant ejection. It was found, that the peak-to-peak voltages needed for resonant ejection could be lowered by about 30 percent by simultaneous application of DC voltages, thereby reducing "off-resonance heating" of the ions. In this context off-resonance heating means an undesired excitation of the desired ions.

SUMMARY

In accordance with the principles of the invention, an asymmetric electric DC field is generated inside an ion trap by a temporal application of DC voltages to at least one of the trap electrodes for the purpose of the elimination of heavy ions, without any simultaneous application of resonance excitation processes. The electric force field pushes the ions from the center towards one of the trap electrodes. Because the pseudopotential inside the trap acts on the ions with a force inversely proportional to their charge-related mass m/z, heavy ions with high values of charge-related masses m/z are pushed stronger away by the DC field than light ions. With a given DC voltage, all ions above a predefined mass limit $(m/z)_{DC\text{-}limit}$, the limit depending on both the RF and the DC voltages, are thus pushed against one of the electrodes and are removed from the trap in a very short time of only one to two milliseconds. This upper mass limit $(m/z)_{DC\text{-}limit}$ for the ions is not as sharply defined as the lower stability limit $(m/z)_{cut\text{-}off}$.

This effect of the DC field is essentially independent of any space charge; it works with any overloading. It removes all heavy ions without affecting the desired ions which neatly remain within the trap if the switching of the DC voltage is not too rapid. In order to not overly excite the desired ions ("off-resonance heating") by a fast switching of the DC voltage, this DC voltage may be ramped smoothly, avoiding any sharp pulse edges.

This application of a DC voltage should favorably be combined with a variation of the amplitude of the RF storage voltage. In a first phase of only about one to two milliseconds, the lower cut-off limit $(m/z)_{cut\text{-}off}$ for ion storage should be shifted, by increasing the RF amplitude, to the lower edge of the isolation window, removing most of the undesired ions which are lighter than the desired ions. In a second phase of one to two milliseconds, the RF amplitude is lowered to shift the upper mass limit $(m/z)_{DC\text{-}limit}$ as near to the isolation window as is possible without losses of desired ions. These two measures together can remove, in a time span of only three to five milliseconds, by far more than 90 percent of all undesired ions, in most cases more than 99 percent.

Subsequently, the well-known processes for ion isolation by resonant excitation (according to the state of the art) can be applied with good success, because the overload is greatly reduced and particularly the heavy ions are fully removed.

DETAILED DESCRIPTION

Figure 4:
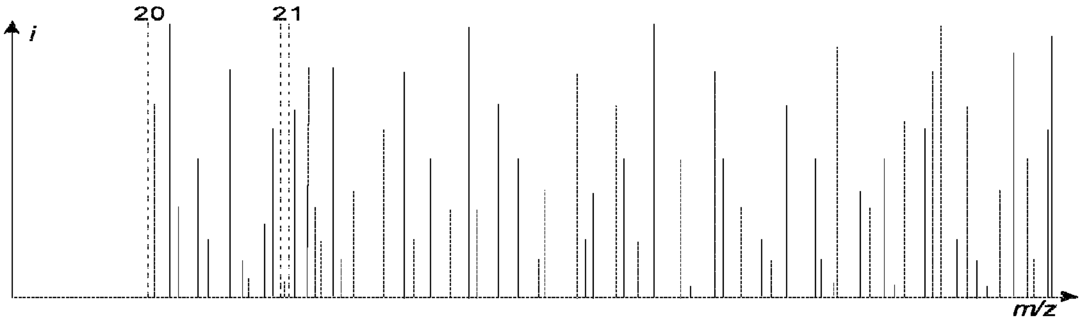
FIG. 4 presents schematically, in form of a hypothetical mass spectrum, a complex mixture of ions. The dashed line (20) denotes the lower cut-off limit for ion storage, the two dashed lines (21) mark the lower and the higher edge of the isolation window. The ions to be isolated amount to a fraction of a percent of the total ion content, which may amount to $10^7$ ions.

As previously mentioned an electric force field is generated across the center of the ion trap, by application of asymmetric DC voltages at or across the trap electrodes, to remove most of the ions heavier than the desired ions in the isolation window (21) of FIG. 4. The removal of the heavy ions takes only a very short time, usually much less than five milliseconds. A preferred embodiment uses only one DC voltage pulse of about one to three milliseconds applied to one trap electrode, either an endcap or a rod electrode. Favorably, the DC pulse should attract the undesired ions towards the electrode; this arrangement shows the fastest removal of heavy ions.

The DC pulse is applied without any additional frequencies for resonant excitation of the ions. It turns out that any additional frequency mixture only flattens the slope of the upper mass limit $(m/z)_{DC\text{-}limit}$ of ion removal by a pure DC, thus deteriorating the method.

Figure 3:
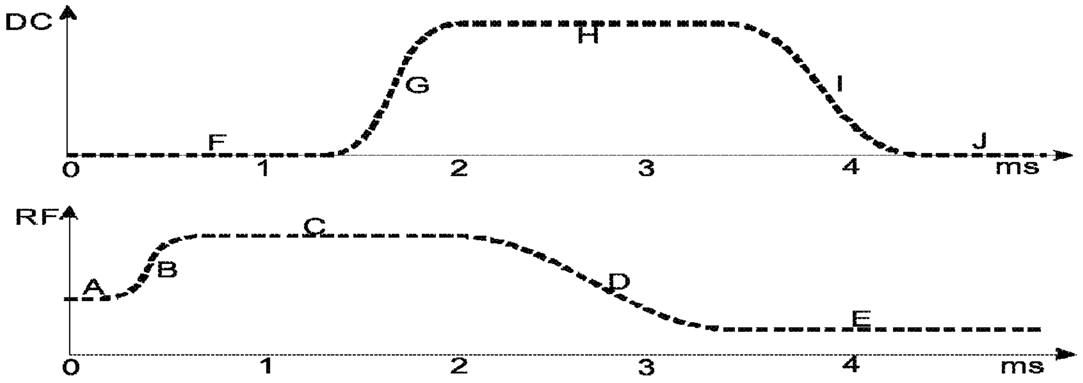
FIG. 3 exhibits, in two diagrams, the most favorable temporal variations of the RF and DC voltages for a removal of most of the undesired ions from the ion trap according to this invention, in a very short time span of only about three to five milliseconds.

The DC pulse should be smooth, without sharp edges, as exhibited in the upper diagram of FIG. 3. As can be shown by Fourier analysis, any sharp pulse is composed of many superimposed frequencies which may unfavorably excite the desired ions inside the isolation window. If this excitation is high, the desired ions even may leave the ion trap; an excitation of lesser height may fragment the desired ions. In any case, the excitation has to be damped before any further process of isolation will be applied. This damping unfavorably needs time, usually some additional milliseconds.

In one embodiment, the smooth DC pulse is combined with a smooth pulse of the RF voltage amplitude. By the RF voltage pulse, the lower storage limit $(m/z)_{cut\text{-}off}$ (20) of FIG. 4 should be shifted near to the lower edge of the isolation window (21) to remove all ions which are lighter than the desired ions. The ions are removed because they become instable within the RF field of the ion trap. Experience shows, that the light ions are not completely removed by application of this RF amplitude shift alone. In the exact center, the quadrupolar RF field disappears, and the ions here do not experience the effects of amplitude changes. Furthermore, these light ions in the exact center are shielded by heavier ions. In this way, the combination of the RF pulse with an additional DC field, driving all ions more or less out of the center, helps greatly to clean the ion trap also from light ions.

In another embodiment of the method according to the invention, the DC and RF voltages should be varied in a sequence as shown in the diagrams of FIG. 3. At first, the RF voltage should be ramped smoothly up by ramp (B) from an initial RF voltage (A) to an RF voltage (C) which shifts the lower cut-off limit $(m/z)_{cut\text{-}off}$ near to the lower edge of the isolation window and removes some of the light ions. Then the DC voltage should be increased smoothly by ramp (G) from the initial zero voltage (F) to a voltage (H), thereby removing a great part of the ions with high masses m/z and helping to eliminate further ions lighter than the ions with desired masses. Ramping down the RF voltage by a smooth ramp (D) to a predefined, relatively low RF voltage (E) should shift the upper mass stability limit $(m/z)_{DC\text{-}limit}$, caused by the DC voltage, as near to upper edge of the isolation window as possible. Finally, the DC voltage at constant value (H) should be smoothly ramped down by ramp (I) to zero (J). The whole process takes only about three to five milliseconds, preferably four milliseconds, but it has to be kept in mind that in a millisecond, the RF with a frequency of about one megahertz undergoes about a thousand periods. At the end of this roughing process, the RF voltage should be ramped up again to a value favorable for the next steps; by no means should the RF voltage be kept that low for a long time, because losses of ions may occur.

One of the endcaps of three-dimensional ion traps is usually connected to the outlet of a digital-to-analog converter (DAC), which in turn is connected to a digital memory. The full shape of the smooth DC voltage pulses can be stored in this memory. The DC voltages can be varied between zero and 200 volts, usually DC voltage pulses of 10 to 30 volts are sufficiently effective.

Some caution has to be paid for the choice of the RF voltage (E). When the DC is ramped up by ramp (G), the lower mass storage limit $(m/z)_{cut\text{-}off}$ shifts a little further towards the isolation window, which has to be taken into account.

In FIG. 4, a complex mixture of ions is presented in the form of a hypothetical mass spectrum, in a greatly overloaded ion trap containing about $10^7$ ions. Such a mass spectrum is hypothetical because it cannot be measured by conventional mass spectrometers due to the overloading. The lower storage limit $(m/z)_{cut\text{-}off}$ is shown by the dashed line (20), and the isolation window is marked by the two dashed lines (21). Within the isolation window, a tiny ion signal is visible, making up only fractions of a percent of all ions within the ion trap. Nevertheless, the tiny signal may correspond to about several thousand ions.

Figure 5:
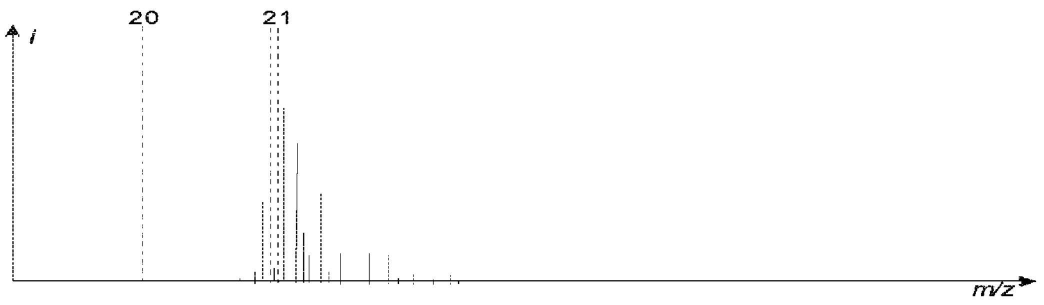
FIG. 5 shows the ion content after the application of the roughing procedure for isolation according to this invention.
Figure 6:
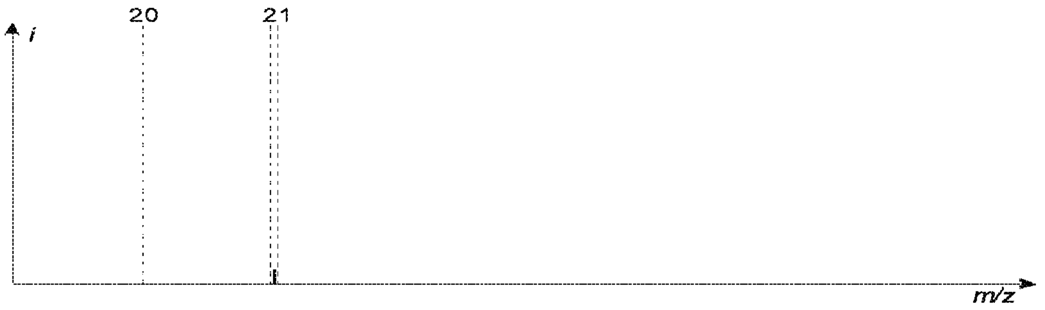
FIG. 6 presents the final result of the isolation, after application of isolation methods according to the state of the art, usually using resonance excitation methods. The signal of the isolated ions appears to be tiny, because the same intensity scale was used as in FIG. 4; but the signal may amount to several thousands ions, enough to get mass spectra of good quality from reaction products of these ions.

After application of the isolation method according to the invention, following the RF and DC voltage ramping according to FIG. 3, the mixture of ions is reduced to a mixture schematically presented in FIG. 5. There are still some undesired ions above the isolation window as well as below this window. But by far more than 90 percent of the undesired ions are removed, usually even more than 99 percent. The overloading is greatly reduced, and all heavy ions are eliminated. The state of the ion trap is now ready for the application of one of the conventional methods known in the prior art, using intelligent resonant excitation methods to cleanly remove the undesired ions and keep the desired ones. The result of such a final isolation is schematically shown in FIG. 6. If the number of these desired ions in the overloaded ion trap amounted to about 5,000, then usually about 4,000 desired ions may be maintained in isolated form, the rest becoming lost during the different isolation processes. The 4,000 ions then may be reacted, for instance by a fragmentation process, and the reaction product ions will give a fragment ion mass spectrum of some good quality. Fragmentation processes can be performed by collisional fragmentation, exciting the ions, or by electron transfer dissociation by the introduction of suitable negative reaction ions into the ion trap.

If the number of isolated ions remaining in the ion trap is too small for further investigations by reactions or fragmentation, the procedure may be repeated several times to catch more desired ions, without ejecting the isolated ions from the trap. Thereby only the roughing process with DC and RF pulses may be repeated, or the full isolation process including the final isolation.

Figure 1:
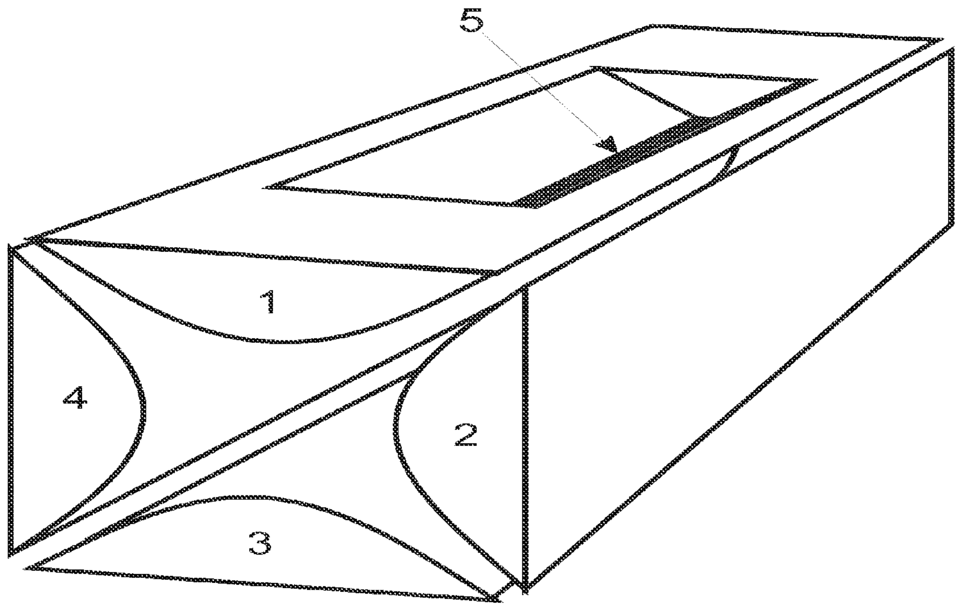
FIG. 1 (Prior Art)
FIG. 1 presents a conventional two-dimensional quadrupole ion trap with hyperbolic rods (1 to 4), usable as a mass spectrometer by mass-sequential ejection of ions through exit slit (5) in one of the rods. Not shown here are the apertured diaphragms located at the trap ends which electrically close the internal volume, and the ion detector in front of the slit. The isolation of desired ions according to this invention can be performed inside such an ion trap.
Figure 2:
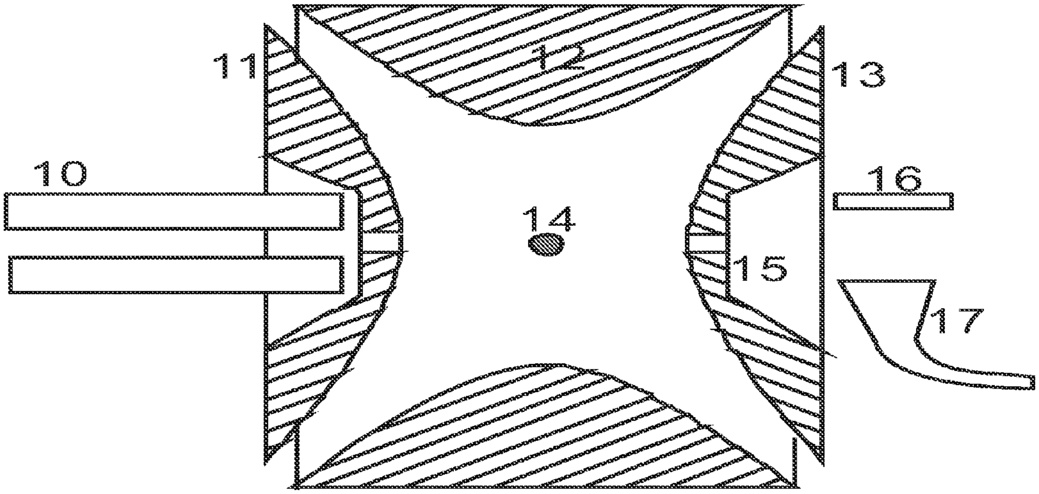
FIG. 2 (Prior Art)
FIG. 2 shows a conventional three-dimensional quadrupole ion trap with hyperbolic ring (12) and two endcap (11, 13) electrodes, an ion guide (10) for the transport of the ions into the trap, and a detector with conversion dynode (16) and channeltron multiplier (17) for acquiring a mass spectrum by mass-sequential ejection of ions from the ion cloud (14) through aperture (15). This ion trap can also be used to isolate ions according to this invention.

To describe the full procedure in some detail, assume for example that it is desired to verify a certain hypothesis on the collection of a certain toxic metabolite of a pharmacon in a given organ. A sample of the organ, say some bone marrow, is homogenized, and the soluble components are extracted. Instead of running a three-hour LC-MS procedure from the extract with unpredictable result, a direct measurement is used. The extract is ionized in an electrospray ion source, and a three-dimensional ion trap (FIG. 2) is filled with about 10,000 ions. The mass spectrum of these 10,000 ions exhibits the presence of a very few ions at the expected mass, but no safe conclusion can be drawn. The ion trap is now overloaded with about $10^7$ ions, which takes some time between 100 milliseconds and one second. The expected ions are first isolated by the roughing process according to this invention, and finally isolated by methods known in the prior art. A mass spectrum of the isolated ions presents a signal of about 300 ions with the correct isotope pattern; but these 300 ions are far too few to be fragmented for a fragment ion spectrum of sufficient quality. Therefore, the filling and isolation process are repeated about ten times, and about 2,000 ions are collected. The 2,000 ions are fragmented by well-known methods. The fragment ion spectrum clearly shows the expected fragment pattern of the metabolite, verifying the hypothesis.

Because every filling process with strong overloading takes less than a second, the mass spectrometric part of the procedure of verifying the hypothesis takes less than ten seconds.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. A method for removing ions having m/z ratios outside of an isolation window in an isolation process conducted in an RF ion trap having a plurality of electrodes, comprising:

(a) filling the trap with ions;

(b) applying an RF voltage having an amplitude to some of the plurality of trap electrodes; and (c) applying a DC voltage pulse of one to five milliseconds duration to one of the plurality of trap electrodes, without applying any additional excitation frequency voltages in order to generate an asymmetric electric DC force field inside the RF ion trap.

2. The method of claim 1, wherein during step (c), the RF voltage amplitude applied in step (b) is increased in order to shift a lower storage cut-off mass $(m/z)_{cut\text{-}off}$ up to the lower m/z edge of the isolation window.

3. The method of claim 2, whereby voltage changes in the DC voltage pulse applied in step (c) and the RF voltage amplitude increase occur smoothly over time without rapid changes to avoid undesired excitation of the ions having m/z ratios within the isolation window.

4. The method of claim 2, wherein the RF and DC voltage amplitudes are changed in the order:

(1) the RF amplitude is increased, then (2) the DC voltage is increased, then (3) the RF amplitude is decreased so that the DC mass limit $(m/z)_{DC\text{-}limit}$ is shifted near to the isolation window, and finally (4) the DC voltage is decreased.

5. The method of claim 4 wherein steps (a)-(c) are repeated a plurality of times in order to collect a large number of desired ions.

6. The method of claim 1, further comprising, after step (c), using a conventional isolation process with resonant removal of residual ions having m/z ratios outside of the isolation window to finish the isolation process.

7. The method of claim 6, wherein steps (a)-(c) are repeated a plurality of times without ejection of ions having m/z ratios within the isolation window, to collect a large number of ions having m/z ratios within the isolation window.

* * * * *